United States Patent
Mott et al.

(10) Patent No.: US 10,053,296 B2
(45) Date of Patent: Aug. 21, 2018

(54) RETURN IDLER TRAINER

(71) Applicant: ASGCO Manufacturing, Inc., Allentown, PA (US)

(72) Inventors: George T. Mott, Alburtis, PA (US); Andrew M. Collier, Whitehall, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 15/707,127

(22) Filed: Sep. 18, 2017

(65) Prior Publication Data

US 2018/0079597 A1 Mar. 22, 2018

Related U.S. Application Data

(60) Provisional application No. 62/396,528, filed on Sep. 19, 2016.

(51) Int. Cl.
*B65G 39/16* (2006.01)
*B65G 15/08* (2006.01)
(Continued)

(52) U.S. Cl.
CPC ............ *B65G 39/16* (2013.01); *B65G 15/08* (2013.01); *B65G 15/64* (2013.01); *B65G 39/071* (2013.01)

(58) Field of Classification Search
CPC ...... B65G 15/08; B65G 15/64; B65G 39/071; B65G 39/16
(Continued)

(56) References Cited

U.S. PATENT DOCUMENTS

| D809,227 S | 1/1906 | Steckel |
| 1,255,659 A | 2/1918 | Stephens |

(Continued)

FOREIGN PATENT DOCUMENTS

| WO | WO96/09237 | 3/1996 |
| WO | WO00/17077 | 3/2000 |

OTHER PUBLICATIONS

Hosch Tracker Roller System Type RG2 Installation and Operations Manual, Hosch-Fördertechnik GmbH, 2015.
(Continued)

*Primary Examiner* — Gene O Crawford
*Assistant Examiner* — Keith R Campbell
(74) *Attorney, Agent, or Firm* — Caesar Rivise, PC

(57) ABSTRACT

An apparatus and method for an automatically pivoting return side idler trainer for returning a drifting conveyor belt back to a central position during operation. The trainer includes a non-collinear shaft having ends fixed to the conveyor structure while a non-collinear tube is pivotally mounted to the shaft. A tapered roller element is rotatably mounted to the tube on each side of the pivotal mounting. The shaft and tube include an offset angle that is determined by the taper angle of the tapered roller elements such that when the trainer is installed, the profile of the roller elements form a level surface along the trainer, parallel to the belt return side, regardless if the belt has a straight or cupped profile. A second embodiment uses a non-collinear shaft to which the tapered roller elements are rotatably mounted and whereby the shaft itself is pivotally mounted to an external conveyor structure.

28 Claims, 11 Drawing Sheets

(51) Int. Cl.
 *B65G 15/64* (2006.01)
 *B65G 39/071* (2006.01)

(58) Field of Classification Search
 USPC .................................................. 198/806, 808
 See application file for complete search history.

(56) References Cited

U.S. PATENT DOCUMENTS

| | | | |
|---|---|---|---|
| 1,705,558 A | | 3/1929 | Cuddihy |
| 1,963,099 A | | 6/1934 | Robins |
| 2,225,276 A | | 12/1940 | Parker |
| 2,561,641 A | | 7/1951 | Thomson |
| 2,660,429 A | * | 11/1953 | Lorig .................... B65G 39/071 226/192 |
| 2,665,592 A | * | 1/1954 | Lorig .................... B65G 39/071 474/123 |
| 2,678,568 A | * | 5/1954 | Orr .................... B65G 39/071 474/148 |
| 2,815,851 A | | 12/1957 | Yoshimura |
| 2,817,940 A | * | 12/1957 | Lorig .................... B65G 39/071 226/192 |
| 5,911,304 A | | 6/1999 | Cumberlege |
| 6,173,830 B1 | | 1/2001 | Cumberlege et al. |
| 6,241,078 B1 | * | 6/2001 | Mott .................... B65G 39/071 198/806 |
| 6,405,854 B1 | * | 6/2002 | Cumberlege .......... B65G 39/16 198/806 |
| 6,550,606 B2 | | 4/2003 | Tapp |
| 6,866,176 B2 | * | 3/2005 | Harris .................... B65G 39/16 226/23 |
| 7,614,493 B2 | * | 11/2009 | Dowling ................ B65G 39/16 198/806 |
| 7,886,895 B2 | * | 2/2011 | Felton .................... B65G 39/16 198/806 |
| 9,139,367 B2 | | 9/2015 | Swinderman et al. |
| 9,145,263 B2 | * | 9/2015 | Ellis ....................... B65G 15/64 |
| 2002/0063042 A1 | | 5/2002 | Fischer et al. |
| 2011/0272250 A1 | | 11/2011 | DeVries |
| 2013/0284565 A1 | * | 10/2013 | Kuiper .................. B65G 15/64 198/617 |
| 2015/0291366 A1 | | 10/2015 | Cumberlege |
| 2016/0264358 A1 | | 9/2016 | Kuiper et al. |

OTHER PUBLICATIONS

Tapered Self-Aligning Idler Set, Hebei Xinshan Conveyor Machinery Co., Ltd., Dec. 21, 2011.
International Search Report for corresponding PCT Application No. PCT/US2017/051966 dated Dec. 26, 2017.
International Search Report for related PCT Application No. PCT/US2015/062607 dated Mar. 11, 2016.

* cited by examiner

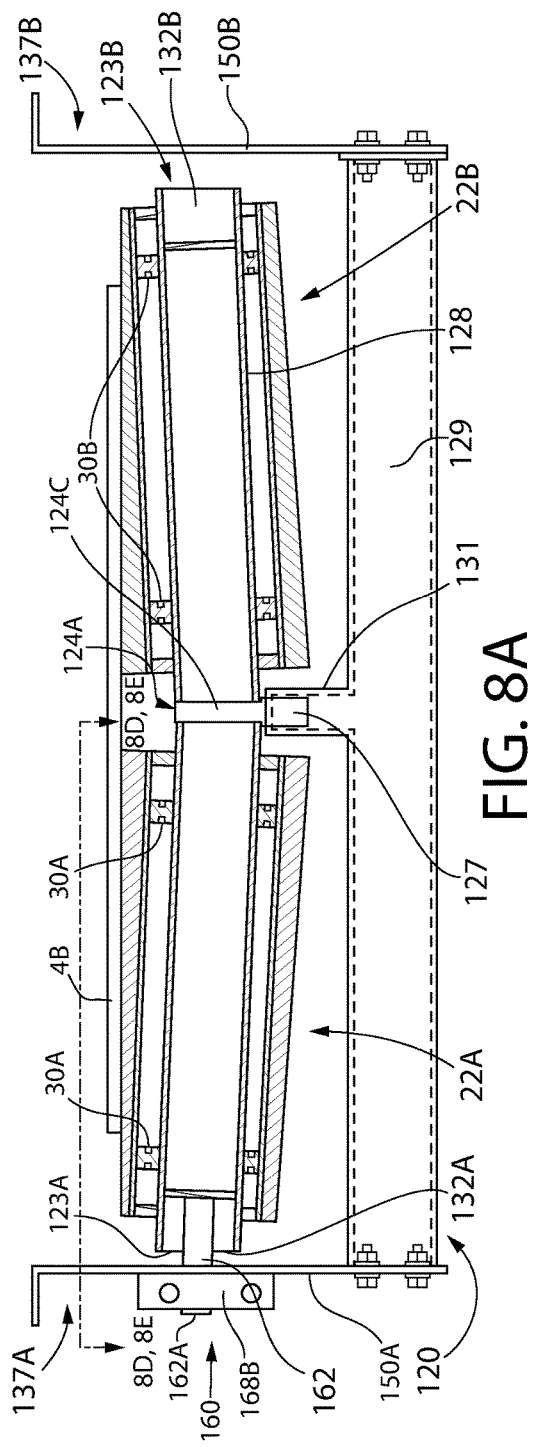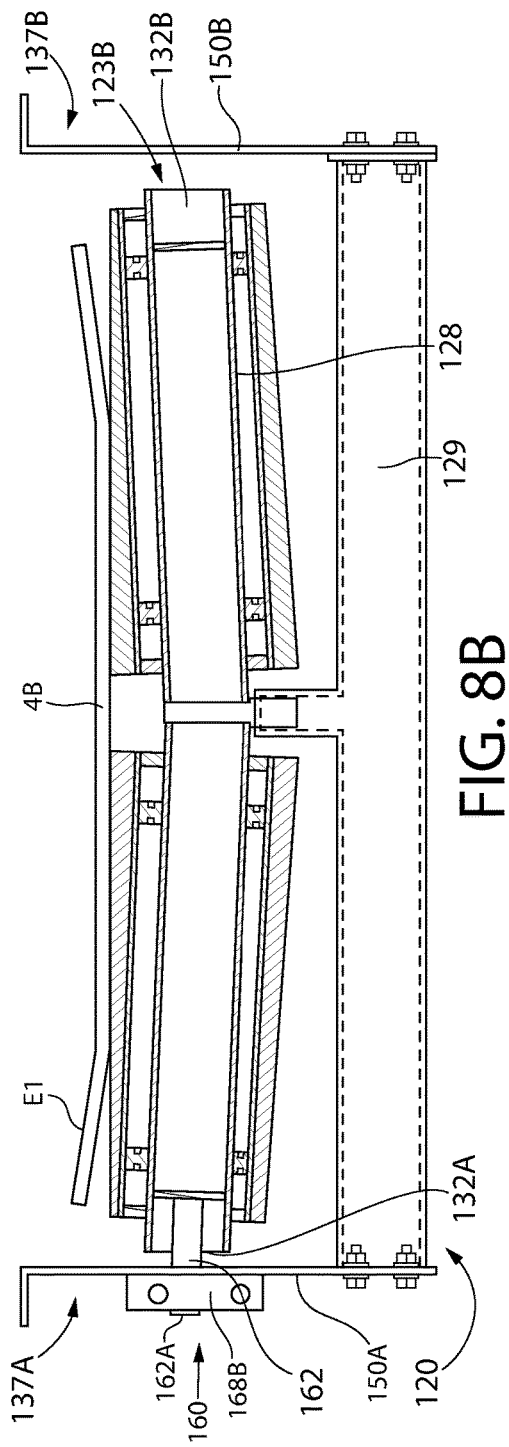

RETURN IDLER TRAINER

CROSS-REFERENCE TO RELATED APPLICATIONS

This non-provisional application claims the benefit under 35 U.S.C. § 119(e) of Application Ser. No. 62/396,528 filed on Sep. 19, 2016 entitled RETURN IDLER TRAINER and whose entire disclosure is incorporated by reference herein.

BACKGROUND OF THE INVENTION

The present invention relates generally to conveyor belt systems and more particularly, to an apparatus and method for training the idlers on the return side of a conveyor belt to automatically center during operation.

Conveyor belts are used in a variety of industries to transport materials from one place to another. Generally, materials are deposited at one end of a conveyor and are transported to the other end, where they are discharged or otherwise removed from the conveyor belt. FIG. 1 depicts a conventional conveyor belt system 1 which comprises an endless conveyor belt 4 that moves around a tail pulley 2 and a head pulley 3. A load L, provided at load station LS, is delivered onto the delivery side 4A of the pulley 4 just forward of the tail pulley 2. The load L is conveyed on the delivery side 4A in the direction 7A toward the head pulley 3 where off-load station OLS dumps the load L into a receptacle 8 (bin, hopper, etc.). The return side 4B of the conveyor belt 4 moves in the direction 7B back to the tail pulley. To assist the pulleys 2-3, idler roller ("idlers") are provided underneath each pulley side 4A/4B, namely, delivery side idlers 5 for the delivery side 4A and return side idlers 6 for the return side 4B. Conveyor belts 4 ideally run centered within the conveyor structure. However, certain conditions cause the conveyor belt 4 to move left or right as it travels. This travel is undesirable as it can cause damage to the conveyor belt 4 edge, structure or components. The delivery side idlers 5 and the return side idlers 6 can be used to correct for this undesirable travel.

With particular reference to the delivery side idlers 5, to assist in containing the load material L upon the delivery side 4A of the conveyor belt 4 during transport, the delivery side 4A of the conveyor belt 4 can be formed into a "trough" configuration. FIG. 2 provides an end view looking down the conveyor belt 4 along line 2-2 of FIG. 1 showing one delivery side idler 5 which forms the delivery side 4A of the conveyor belt 4 into a "trough" configuration to assist in containing the load material L. This is typically accomplished via the use of a center roller having angled idlers on each side of the center roller (see U.S. Pat. No. 2,225,276 (Parker)) or by having a Y-shaped support having idlers on each leg of the upper portion of the "Y" (see U.S. Pat. No. 6,405,854 (Cumberlege)). See also U.S. Pat. No. 1,705,558 (Cuddihy); U.S. Pat. No. 1,963,099 (Robins); U.S. Pat. No. 2,561,641 (Thomson); U.S. Pat. No. 2,815,851 (Yoshimura) and U.S. Pat. No. 6,173,830 (Cumberlege, et al.). In addition, due to the uneven loading of the content on the trough-configured conveyor belt, the sides of the conveyor may tend to "creep" along either one of the angled idlers, thereby mis-aligning the conveyor belt. To correct for this "creep" self-aligning tracking assemblies are introduced at predetermined locations along the trough-configured conveyor belts 4. See also Tracker Roller Systems Type R/RG/RC/RRC by Hosch-Fordertechnik GmbH, or the Tapered Self-Aligning Idler Set 2.6.1 by Hebei Xinshan Conveyor Machinery co. Ltd. of Hebei, China.

As for the return side idlers 6, as also shown in FIG. 2, these tend to be single or dual rollers for guiding the return side 4B back to the tail pulley 2. As also mentioned earlier, the return side idlers 6 can be used to correct for the undesirable travel of the conveyor belt 4. As shown in FIG. 3A, a common practice is to angle the return side idlers 6A at their side mounting brackets to force the conveyor belt 4 to move along the center of the conveyor structure (the black arrowhead in FIG. 3A indicates the direction that the idler 6A is directing the belt 4). But this requires continuous adjustment due to the wide range of factors that cause the belt 4 to move.

To avoid having to continually adjust the return side idlers 6A, another solution is to pivotally mount the return side idlers 6B to automatically adjust the angle of the return side idlers 6B and steer the conveyor belt 4 back into central alignment. See FIG. 3B. This automatic adjustment feature of allowing the idler 6B to pivot earns these idlers the term of "training idlers" whereby the training idler has a central pivot, thereby allowing the idler to pivot in the direction needed to steer the belt 4 back to center. Furthermore, in variations of these training idlers, vertical rollers 9 (the tops of which are only shown in FIG. 3B) are used to force the idler 6B to pivot. In particular, the edge of the return side 4B of the conveyor belt 4 contacts the roller 9 and moves that end of the idler 6 in the direction of the conveyor belt 4 movement. This movement of the idler 6B thereby causes the conveyor belt 4 to begin working its way back to the center of the conveyor structure. However, there are several problems with the vertical guide rollers 9:

- the conveyor belt 4 must move a significant distance for the edge of the conveyor belt 4 to contact the rollers;
- vertical guide rollers are large assemblies and require a large footprint to operate; conventional conveyor systems are designed around having a standard return side idler, and thus cannot support a larger footprint (i.e., the vertical guide rollers); and
- contact between the conveyor belt 4 edge and the vertical guide rollers causes damage to the rollers and the conveyor belt edge.

Another style of return side idlers 6C involve the use of tapered idler ends (see U.S. Pat. No. 5,911,304 (Cumberlege)) which solve some of the problems associated with the vertical guide rollers 9. As shown in FIG. 3C, as the return side 4B of the conveyor belt 4 moves from the center of the idler 6C, the tapered ends 10 of the idler 6C cause the conveyor belt 4 to contact part of the idler 6C with a smaller diameter. As shown in FIG. 3C, the speed differential caused by the difference in diameter (viz., D2<D1) forces the one side of the idler 6C to drag forward, thereby "training" the conveyor belt 4 back to center. However, problems exist with these return side idlers 6C, namely:

- as shown in FIG. 3D, some conveyor belts 4 develop a "cupped" profile that causes the conveyor belt sides to "flare" upward which does not permit the belt 4 sides to contact the tapered ends 10 of the idler 6C; the cupped profile typically occurs from the "trough" configuration on the delivery side 4A of the conveyor belt 4;
- in certain high tension applications, the conveyor belt 4 maintains a straight profile (see FIG. 3E) but due to the smaller diameter of the tapered ends 10, those ends are also "out of contact" with the return side 4B of the conveyor belt 4.

Thus, in view of the foregoing, there remains a need for a return side idler that does not suffer from the above-identified problems of conventional return side idlers and thereby maintains sufficient contact with return side of the conveyor belt to "train" the belt, regardless if the return side is cupped or straight, back to center during operation.

All references cited herein are incorporated herein by reference in their entireties.

BRIEF SUMMARY OF THE INVENTION

An apparatus for providing automatic adjustment of the return side of a conveyor belt, operating in a conveyor structure, that has drifted from its central position during operation is disclosed. The apparatus comprises: pair of tapered roller elements rotatably mounted to a non-collinear pivoting member, wherein each of the pair of tapered roller elements is tapered from one end of the roller element to its opposite end and wherein the pair of tapered roller elements are rotatably mounted on opposite sides of a pivot point of the non-collinear pivoting member; and the pair of tapered roller elements form a profile that is parallel to and in contact with a horizontal portion of the return side of the conveyor belt, and wherein the tapered roller elements rotate and pivot automatically to restore the conveyor belt to its central position.

A method for providing automatic adjustment of the return side of a conveyor belt, operating in a conveyor structure, that has drifted from its central position during operation is disclosed. The method comprises: providing a pair of tapered roller elements on opposite sides of an angled member that pivots in a plane parallel to the return side of the conveyor belt, and wherein each of the tapered roller elements is tapered from one end of the roller element to its opposite end; positioning the tapered roller elements into contact with the return side of the conveyor belt such that the pair of tapered roller elements form a profile that is parallel with a horizontal portion of the return side of the conveyor belt; and wherein the angled member automatically pivots and the tapered roller elements automatically roll against the return side of the conveyor belt for restoring the conveyor belt to its central position during conveyor belt operation.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8A is a cross-sectional view, similar to FIG. 4B, but showing a second embodiment of the return idler trainer which uses an external pivot;

FIG. 8B shows the second embodiment of the return idler trainer being used with the return side of a conveyor belt having a cupped profile;

DETAILED DESCRIPTION OF THE PREFERRED EMBODIMENTS

Figure 1:
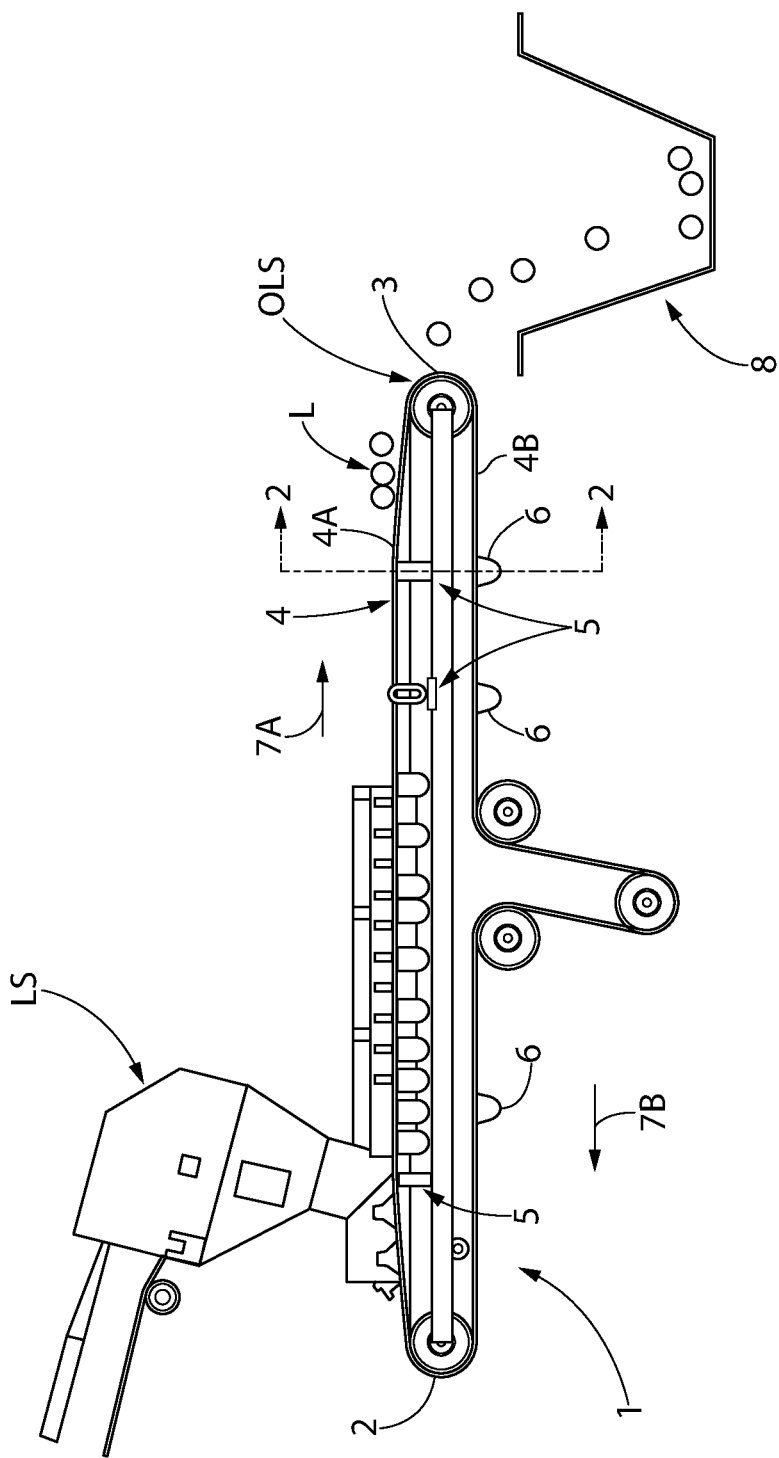
FIG. 1 is a functional diagram of a prior art conveyor belt system for delivering a load L from a load source LS to an off-loading station OLS and depicting the use of delivery side idlers and return side idlers.
Figure 2:
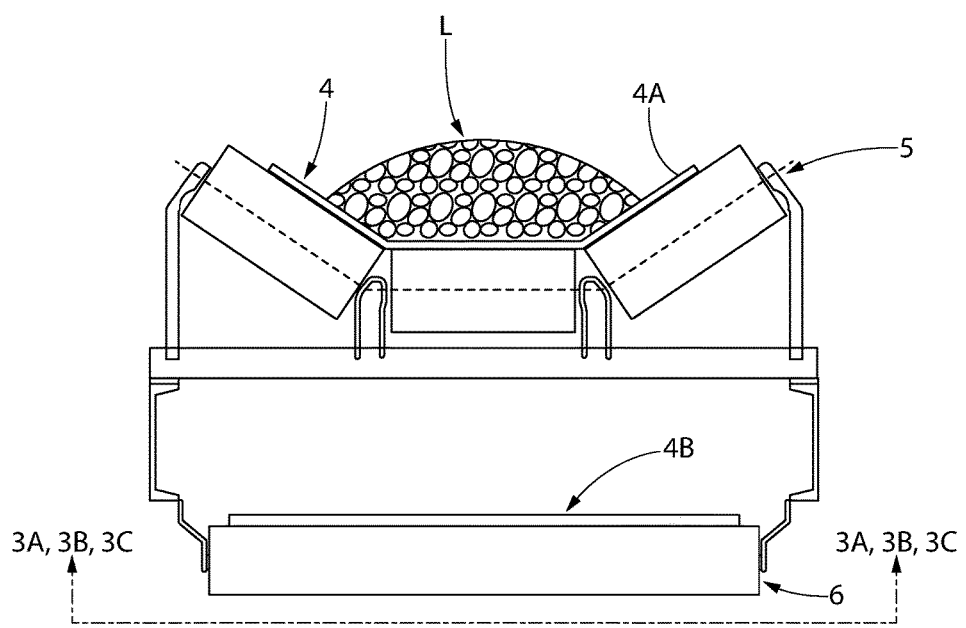
FIG. 2 is view of a prior art delivery side trough training idler taken along line 2-2 of FIG. 1.
Figure 3A:
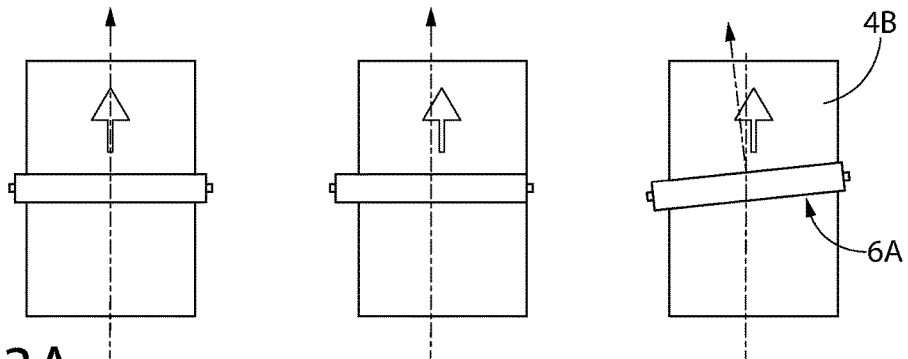
FIG. 3A are three bottom views of a prior art return side idler, which is manually adjustable, taken along line 3A-3A of FIG. 2, showing from left to right: centered belt operation, slight training by idler and extreme training by idler.
Figure 3B:
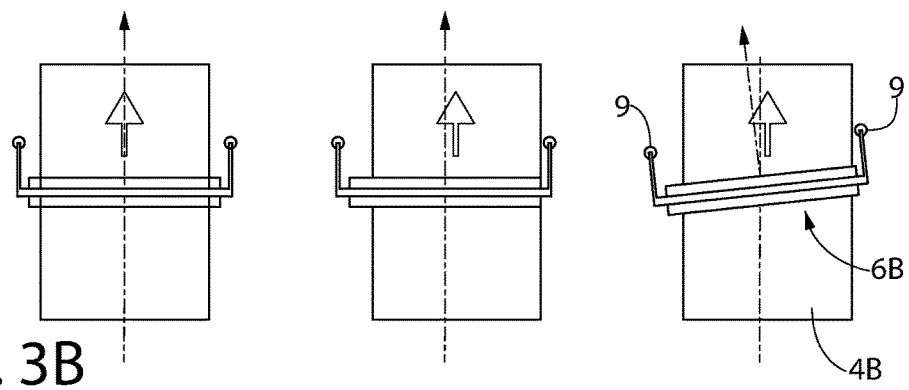
FIG. 3B are three bottom views of another prior art return side idler, which is automatically adjustable and uses vertical side rollers, taken along line 3B-3B of FIG. 2, showing from left to right: centered belt operation, slight training by idler and extreme training by idler.
Figure 3C:
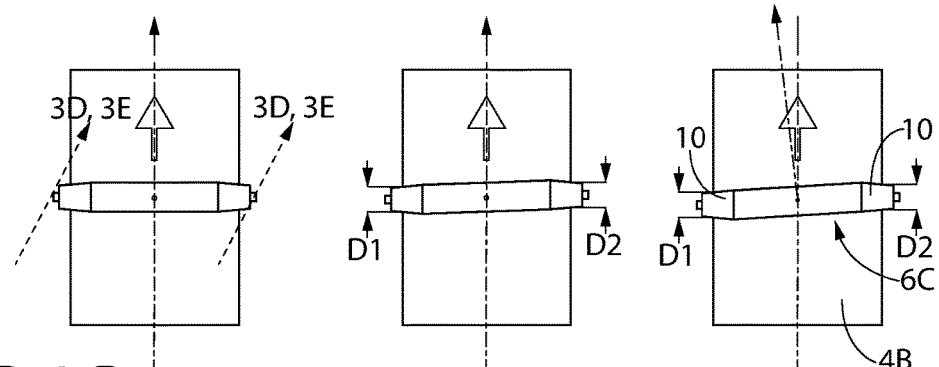
FIG. 3C are three bottom views of another prior art return side idler, which is automatically adjustable and uses tapered ends, taken along line 3C-3C of FIG. 2, showing from left to right: centered belt operation, slight training by idler and extreme training by idler.
Figure 3D:
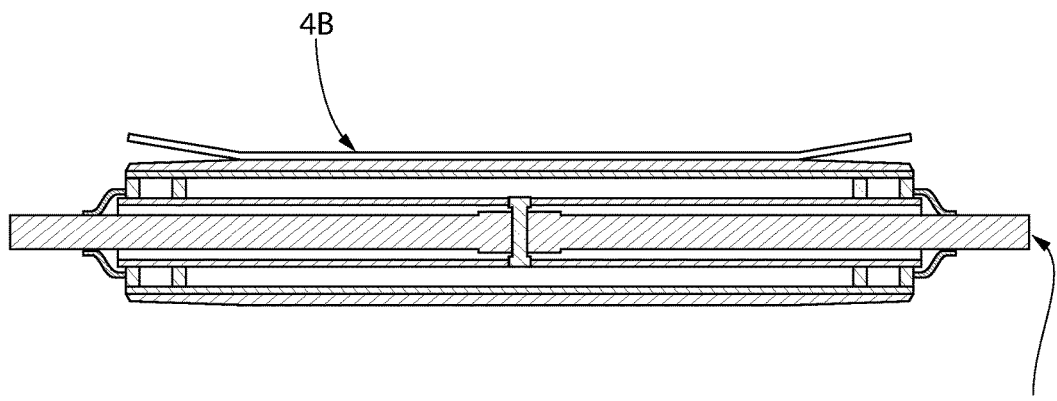
FIG. 3D is a cross-sectional view of the prior art return side idler of FIG. 3C, taken along line 3D-3D of FIG. 3C, and where a "cupped" profile of the return side of the conveyor belt is encountered by the return side idler.
Figure 3E:
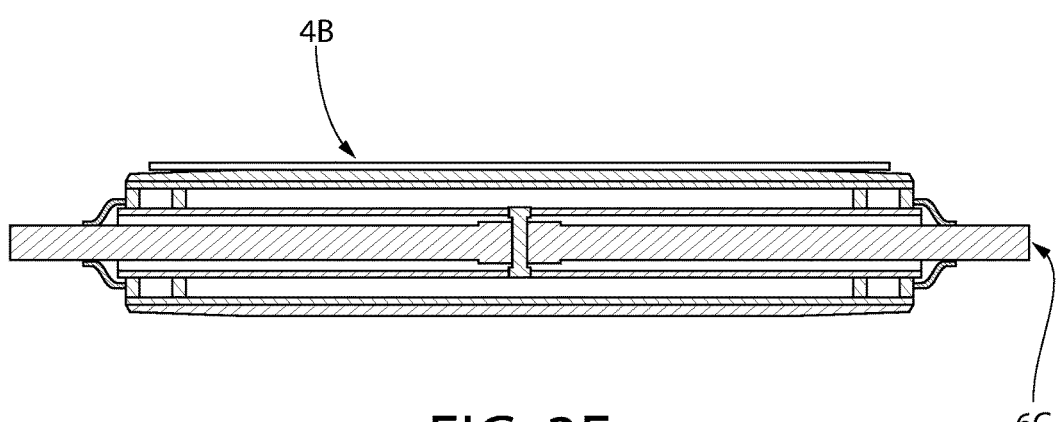
FIG. 3E is a cross-sectional view of the prior art return side idler of FIG. 3C, taken along line 3E-3E of FIG. 3C, and where a "high-tension, straight" profile of the return side of the conveyor belt is encountered by the return side idler.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 4:
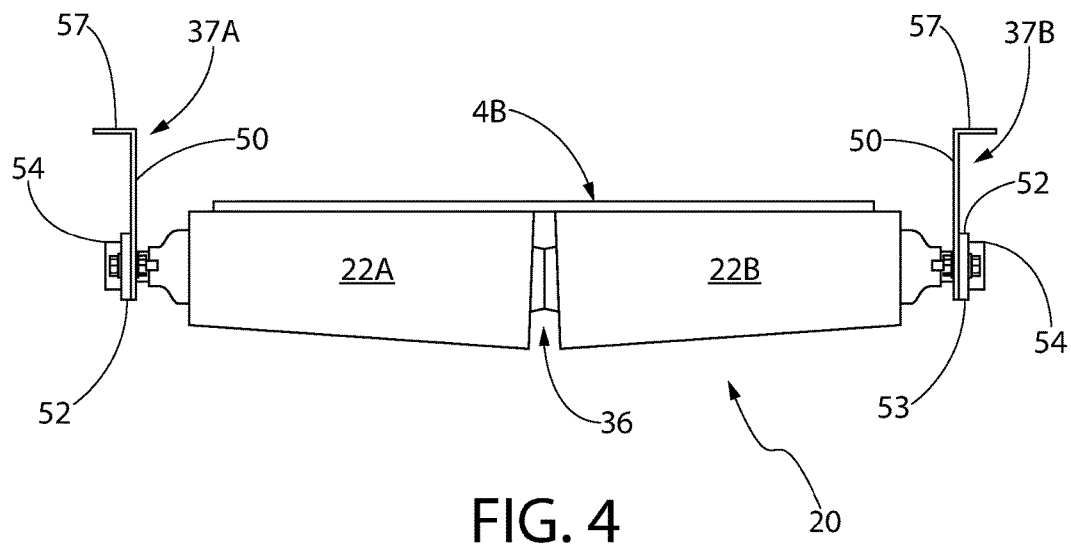
FIG. 4 is an elevation view of the return side training idler of the present invention.
Figure 4A:
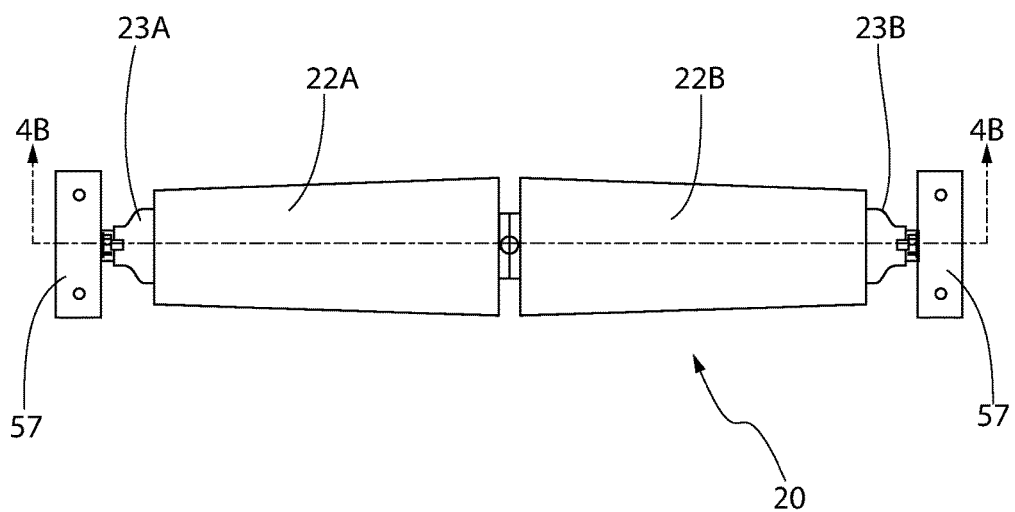
FIG. 4A is a top view of the return side training idler of the present invention.
Figure 4B:
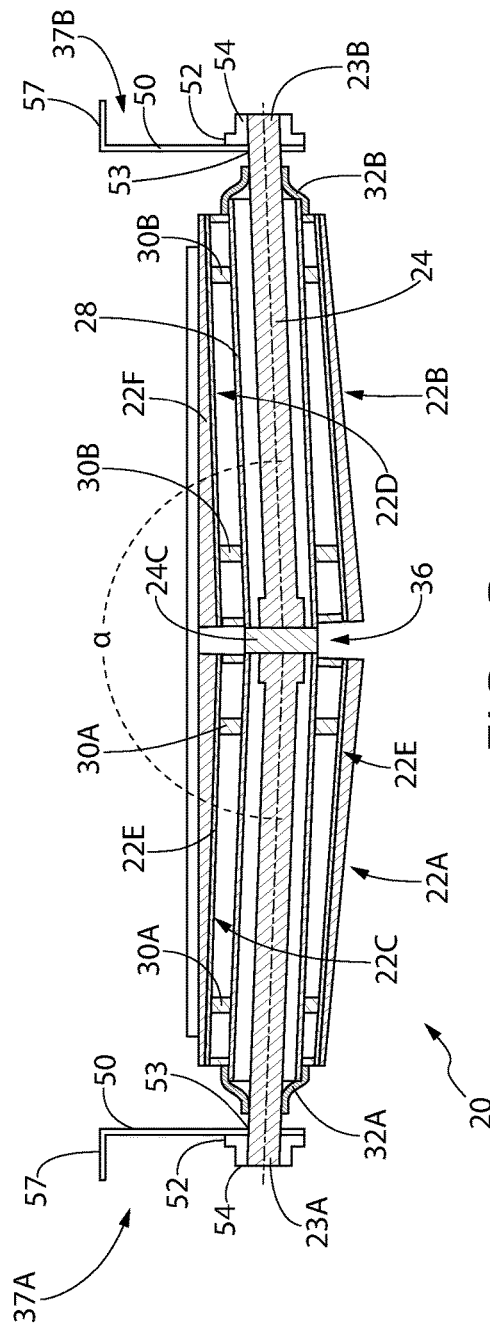
FIG. 4B is a cross-sectional view of the return side training idler taken along line 4B-4B of FIG. 4A.
Figure 5:
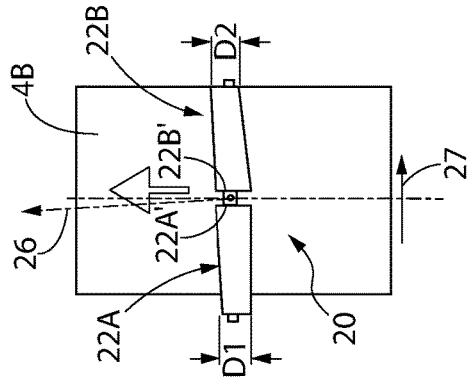
FIG. 5 shows the return training idler of the present invention operating when the conveyor belt is centered.
Figure 5A:
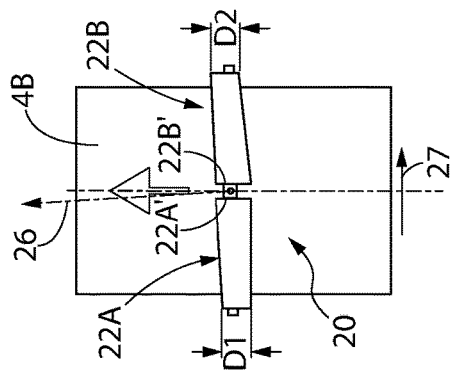
FIG. 5A shows the return training idler of the present invention automatically pivoting to begin returning a slightly "drifting" conveyor belt back towards center.
Figure 5B:
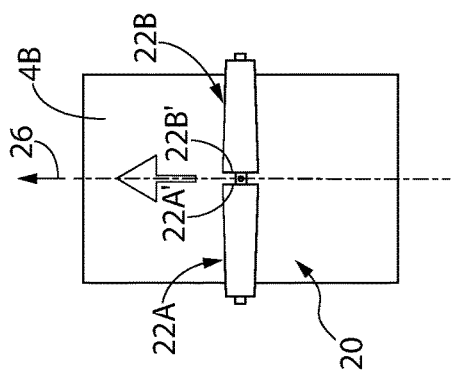
FIG. 5B shows the return training idler of the present invention automatically returning a highly drifted conveyor belt back to center.

To overcome the problems of the prior art return side idlers 6, as shown in FIGS. 4A-4B, the present invention is a return side idler 20 comprising two, fully-tapered roller elements 22A/22B that are pivotally-mounted to a fixed non-collinear shaft 24 (FIG. 4B), as will be discussed below. The relative angle of the shaft 24 matches the angle of the taper of the roller elements 22A/22B. This, in turn, provides the trainer idler 20 a linear top profile that is parallel to the bottom of the return side 4B of the conveyor belt 4. With each roller element 22A/22B being completely tapered, no matter the profile of the conveyor belt 4, the trainer idler 20 is engaged with the belt 4. When the conveyor belt 4 is running centered with the system (FIG. 5), the portion of the return side 4B contacting the idler 20 is contacting equivalent diameters on either roller element 22A and 22B. If the conveyor belt 4 begins to drift towards the right (see arrow 27—see FIGS. 5A-5B), the left side of the belt 4 moves to a larger diameter on the roller element 22A while the right side of the belt 4 moves to a smaller diameter on the roller element 22B. As such, the peripheral speed of the roller element 22B, at the location where the right edge of the belt 4 contacts the roller element 22B, will have a peripheral speed which is slower than the inner ends 22A'/22B' (FIGS. 5A and 5B). The end result of this speed differential is that the belt 4 will tend to drag the roller element 22B forward, thereby automatically pivoting the idler 20 in a counter-clockwise motion. This dragging effect tends to steer or "train" the belt 4 in the direction of arrow 26, causing the belt 4 to return to its centered position. Once the belt 4 re-centers, the idler 20 then rotates clockwise to re-align itself transversely of the belt 4, as shown in FIG. 5. Thus, this pivoting (also referred to as "slewing") motion occurs automatically to re-steer the belt 4 to its centered position. Conversely, should the belt 4 tend to drift to the left, the idler 20 would automatically pivot in a clockwise motion to "train" the conveyor belt 4 back to its centered position, using the same mechanism described above based on the different peripheral speeds and the dragging effect of the roller element. The pivoting or slewing motion of the roller elements 22A/22B of the idler 20 occurs in a plane parallel to the return side 4B of the conveyor belt 4 while rolling against the return side 4B.

Figure 6:
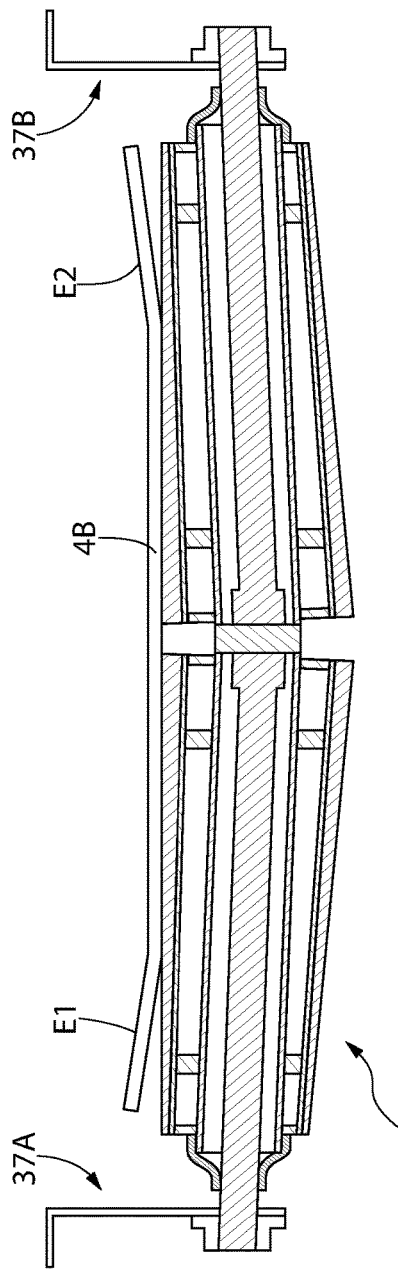
FIG. 6 shows how the return training idler of the present invention operates to center the "drifting" conveyor belt even when a "cupped profile" of the conveyor belt is encountered.

In particular, because the roller elements 22A/22B are tapered along their full lengths, as shown in FIG. 4, the return side 4B of the conveyor belt 4 is always in contact with the roller elements 22A/22B, thereby resulting in the return side idler 20 always engaging the return side 4B; in other words, because the roller elements 22A/22B taper their entire length, the speed differential always occurs along the full length of the roller elements 22A/22B. Furthermore, even where a "cupped profile" of the return side 4B occurs (see FIG. 6) and the edges E1/E2 of the return side 4B are not in contact with the roller elements 22A/22B, the majority of the taper of the roller elements 22A/22B are in contact with the return side 4B and, as such, those tapered portions can "train" the return side 4B back to center of the conveyor structure.

As shown most clearly in FIG. 4B, the structure of the return side idler 20 basically comprises the non-collinear shaft 24, a non-collinear pivot tube 28, bearings 30A/30B and the roller elements 22A and 22B. In particular, the roller elements 22A/22B are rotatably mounted on the non-collinear pivot tube 28. In addition, end caps 32A/32B (e.g., rubber) are provided on each end of the shaft 24 to prevent material from entering the pivot tube 28. Each roller element 22A/22B comprises a roller shell 22C/22D (e.g., steel) that is rotatably movable about the bearings 30A/30B, respectively. Formed on the outside surface of the roller shells 22C/22D are the respective roller laggings 22E/22F that provide the tapered surfaces to the roller elements 22A/22B. FIG. 4C is cross-sectional view of one of the roller elements, namely, roller element 22B (it being understood that roller element 22A is constructed similarly), and depicts the taper angle θ (by way of example only, 2°) which is the angle between the roller shell 22D's outer surface and the outside surface of the roller lagging 22F (FIG. 4C). The taper angle θ is used to determine the offset angle α of the non-collinear shaft 24 and the non-collinear pivot tube 28, shown in FIGS. 7A-7B. In particular, the angle α is defined by 180°−2θ. As such, when the return idler trainer 20 is installed in the conveyor system, the top profile of the roller elements 22A/22B form a level surface over the full length of the return idler trainer 20 that is parallel to and in contact with a horizontal surface of the return side 4B of the conveyor belt 4, as shown most clearly in FIG. 4B.

Figure 7A:
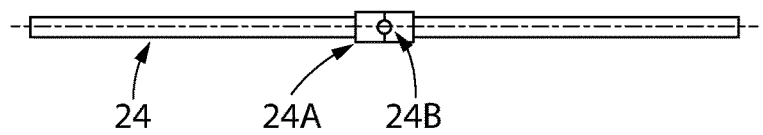
FIG. 7A is a top view of the non-collinear shaft of the return idler trainer.
Figure 7B:
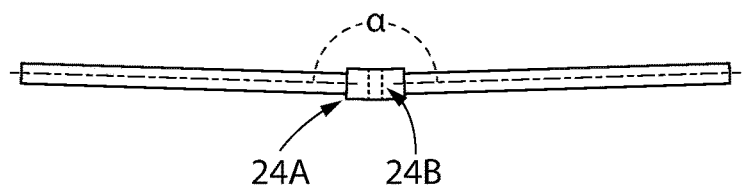
FIG. 7B is a side view of the non-collinear shaft of the return idler trainer.
Figure 7C:
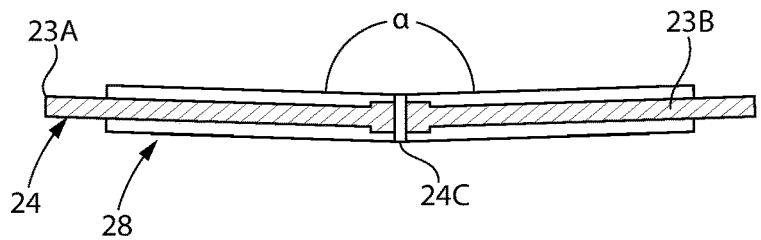
FIG. 7C is cross-sectional view of the non-collinear pivot tube installed on the non-collinear shaft.
Figure 7D:
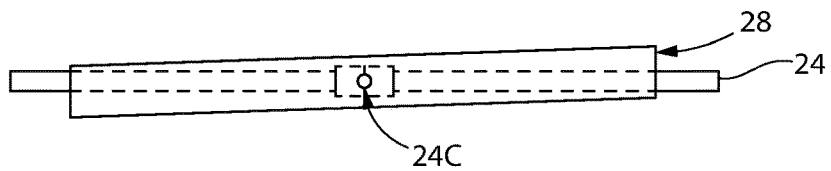
FIG. 7D is a top view of the non-collinear pivot tube shown in a maximum pivot state, impacting the fixed non-collinear shaft.

As shown most clearly in FIGS. 7A-7B, the shaft 24 (e.g., steel) comprises a center portion 24A having a channel 24B (FIGS. 7A-7B). The non-collinear pivot tube 28 (e.g., steel) is slid over the shaft 24 and a pivot pin/bushing 24C (also referred to as an "internal pivot") is positioned within the channel 24B. As such, with the ends 23A/23B (FIGS. 4 and 7C) of the shaft 24 fixed, using an elevation control mechanism 37A/37B (see FIGS. 4A-4B) during operation, the pivot tube 28 is able to pivot about the shaft 24 as shown most clearly in FIG. 7D. It should be noted that FIG. 7D also depicts the maximum rotational displacement of the pivot tube 28 since the inside surface of the pivot tube 28 has contacted the shaft 24 at different locations. In addition, the offset angle α of the shaft 24/pivot tube 28 also provides for a larger gap 36 (FIG. 4) on the bottom of the idler 20. As a result, any material that falls through the top of the idler 20 will be discarded through the gap 36.

Figure 7E:
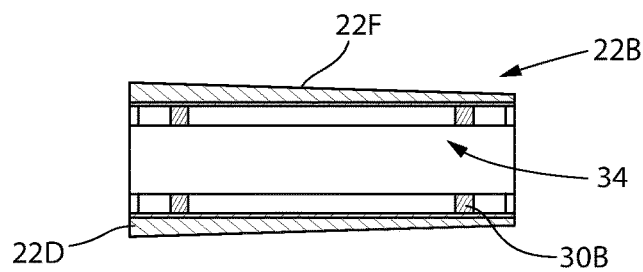
FIG. 7E is cross-sectional view of one of the roller elements using an "indirect bearing coupling", namely, a roller tube to which the bearings are secured.

The bearings 30A/30B can be fixed on the outside surface of the pivot tube 28, as shown in FIG. 4B and the roller shells 22C/22D rotate about those bearings. Alternatively, as shown in FIG. 7E, instead of fixing the bearings 30A/30B directly to the pivot tube 28, the bearings 30A/30B can be fixed to a separate inner roller tube 34 (e.g., steel) which is then slid over the pivot tube 28, and hence referred to as an "indirect" mount to the pivot tube 28. The alternative locations of the bearings 30A/30B, namely, directly or indirectly to the pivot tube 28, are preferably implemented in a removable manner to make replacing the roller elements 22A/22B easier. In addition, whether the direct or indirect configuration is used, the bearings 30A/30B are completely sealed from the outside via the use of rotary seals as well as via the end caps 32A/32B.

Figure 4D:
FIG. 4D is a side view of the return side idler showing an exemplary elevation control mechanism.
Figure 4C:
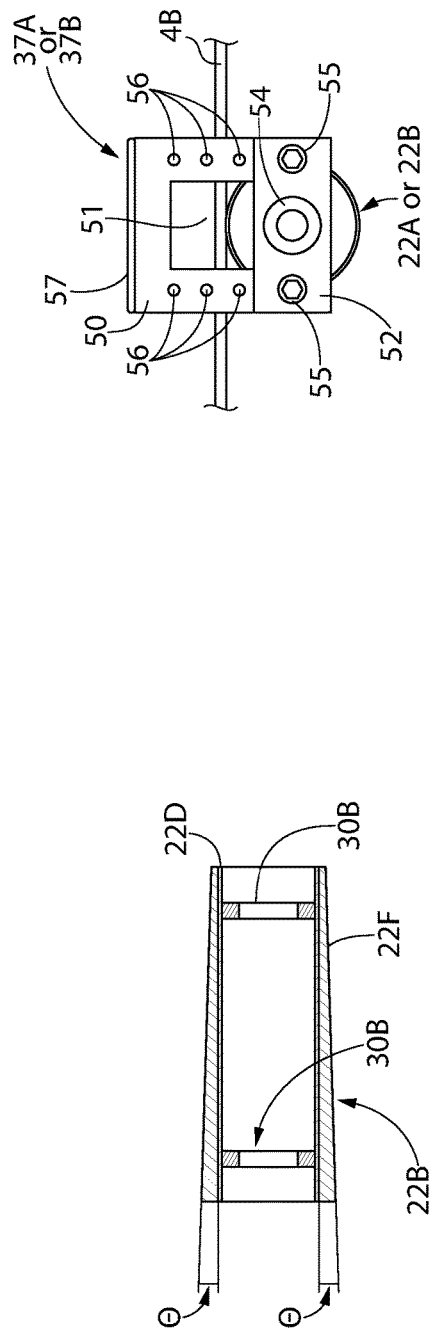
FIG. 4C is a cross-sectional view of one of the roller elements of the return side idler.

As shown most clearly in FIG. 4D, the elevation control mechanism 37A/37B allows the height or elevation of the idler 20 to be adjustable while at the same time fixing the ends 23A/23B. The following discussion is for one of the elevation control mechanisms 37A, it being understood that it applies to the other elevation control mechanism (ECM) 37B. The ECM 37A comprises an adjustment plate 50 having an aperture 51 therein. A bracket 52 receives the shaft end 23A or 23B within a center hole 53 and the end of the shaft 23A/23B is then releasably secured to the bracket 52 using a nut 54. The bracket 53 can then be releasably secured at various elevations via screw/bolts 55 that pass through holes in the bracket 52 and into corresponding holes 56 in the adjustment plate 50. The overall ECM 37A or 37B is secured to the conveyor system (not shown) or other fixed structure via a top member 57.

The roller elements 22A/22B are constructed of abrasive resistant rubber in normal conditions or of high durometer urethane in heavy duty applications. The roller elements 22A/22B also comprise grooves to direct water away from the center of the return idler trainer 20 when the trainer 20 is exposed to wet applications.

It should be further noted that openings between fixed and pivoting components of the return idler trainer 20 that permit the trainer 20 to pivot are capped/covered using a flexible seal which does not impede the movement of the trainer 20. In addition, any gaps that occur from using two independent roller elements 22A/22B are capped in such a way as to prevent build-up from occurring.

The embodiment disclosed in FIGS. 4-7E involve the use of an "internal" pivot. In particular, with the non-collinear shaft 24 ends fixed, the pivot tube 28 pivots internally about the pivot pin/bushing 24C. FIGS. 8A-8E depict a second embodiment 120 whereby the return idler trainer pivots about an external pivot. As such, external stops are needed to limit the pivoting range of the second embodiment 120, as will be discussed in detail below.

In particular, in the second embodiment 120, a non-collinear shaft 128 (e.g., steel) replaces the non-collinear shaft 24/non-collinear pivot tube 28 assembly and thus there is a need to limit the pivoting range of the idler embodiment 120; this is accomplished by introducing an extension and associated stops on at least one end of the idler embodiment 120 (most clearly shown in FIGS. 8C-8E); this is by way of example only and other pivoting range limitation mechanisms are included within the broadest scope the present invention.

The shaft 128 comprises a central portion 124A having a pivot pin 124C having a distal end 127 that is adapted for insertion into a receptacle 131 of an idler support base portion 129. Elevation control mechanisms (ECMs) 137A/137B are coupled to the idler support base portion 129 to permit the height or elevation of the idler 120 to be adjusted up or down. The ECMs 137A/137B comprise adjustment plates 150A/150B that permit this height adjustment, along the lines discussed previously with ECMs 37A/37B but more simpler in configuration since the ECMs 137A/137B do not couple to the ends of the non-collinear shaft 128.

All other aspects of the return idler trainer 120 are identical to the return idler trainer 20 discussed previously, including the taper angle θ and offset angle α. Furthermore, although FIGS. 8A-8B show the bearings 30A/30B being secured to the shaft 128, it should be understood that the indirect coupling (viz., the bearings 30A/30B being coupled to the separate inner roller tube 34, as shown in FIG. 7E) is also within the broadest scope of the return idler trainer 120. In particular, the separate inner roller tube 34 would be slid over shaft 128, as discussed previously with regard to the pivot tube 28 of the first embodiment 20.

Figure 8D:
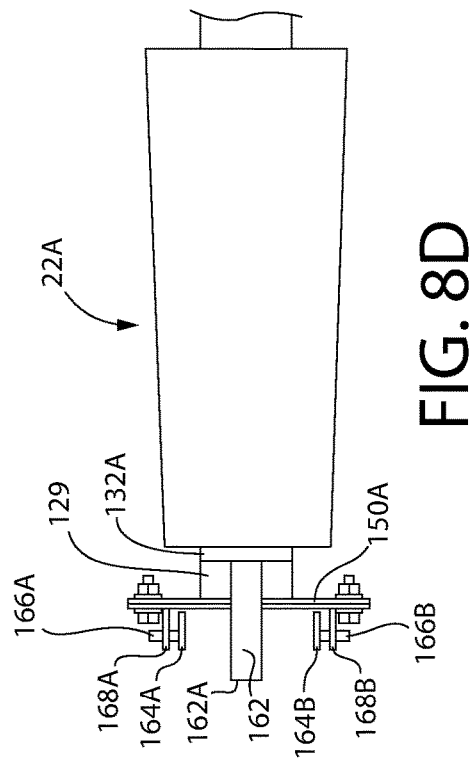
FIG. 8D is a partial view, taken along line 8D-8D of FIG. 8A, showing the stop mechanism with the idler in its neutral, belt-centered position.
Figure 8E:
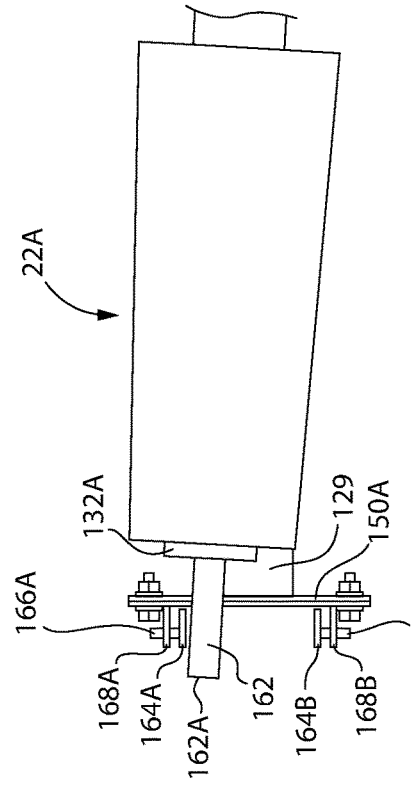
FIG. 8E is a partial view, taken along line 8E-8E of FIG. 8A, showing the stop mechanism with the idler in a maximum pivoted direction, resting against one stop, to "train" the belt back to its centered position.
Figure 8C:
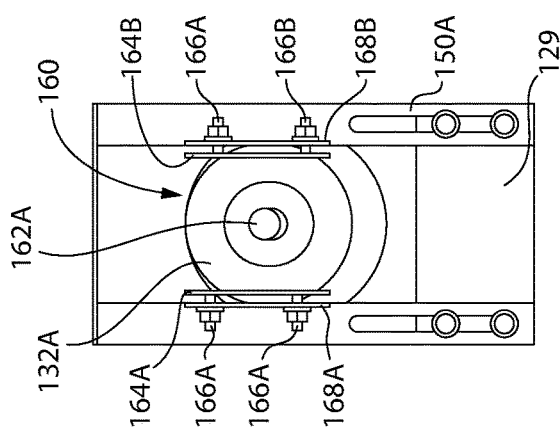
FIG. 8C is a side view of FIG. 8D showing the stop mechanism for the second embodiment of the return idler trainer.

As mentioned previously, the second idler embodiment 120 comprises an external stop mechanism 160, as best shown in FIGS. 8C-8E. In particular, the external stop mechanism 160 comprises an extension 162 coupled (e.g., threadedly engaged, etc.) to one end (e.g., shaft end 123A) of the non-collinear shaft 128. The extension 162 is passes through an end cap 132A that prevents the entry of debris through the end 123A of the shaft 128; a corresponding end cap 132B is secured to the opposite end 132B of the shaft 128 (see FIGS. 8A and 8B) for the same reason. The extension 162 has a free end 162A that can make contact with a respective stop 164A or 164B, depending on which way the idler 120 is pivoting. Each stop 164A/164B can be adjusted via a stop stud 166A/166B that is displaceable (e.g., threaded engaged, etc.) with regard to a respective base plate 168A/168B which are secured or form part of the adjustment plate 150A. As such, FIGS. 8C-8D depict the return idler trainer of the second embodiment 120 in its non-training or belt-centered condition. In contrast, FIG. 8E depicts the extension 162 resting against stop 164A which indicates the maximum "training" aspect of the idler 120 when the belt 4 has drifted In view of the above, with the pivot pin 124C inserted into the receptacle 131, the return idler trainer 120 is able to automatically pivot to "train" the conveyor belt 4 to return to the center position, in the same manner as discussed above with regard to the first embodiment 20. FIG. 8B depicts how the second embodiment 120 also can "train" the conveyor belt 4 to return to the center position even if the return side 4B has a "cupped profile" where the belt edges E1 and E2 are out of contact with the roller elements 22A/22B.

Figure 9:
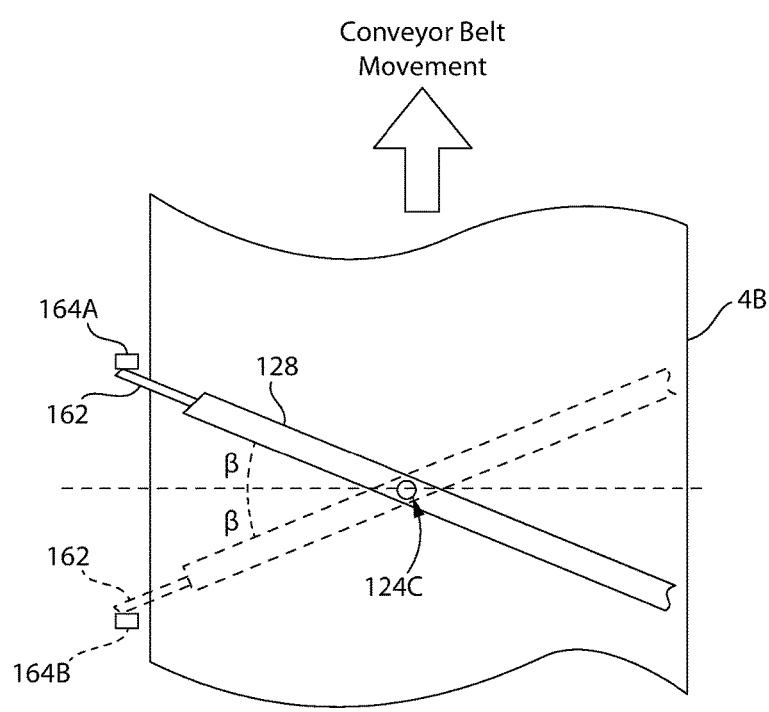
FIG. 9 is a functional diagram showing a pivoting range motion that maximizes the training capability of the second embodiment of the return idler trainer looking down at the top of the idler trainer, with the pivoting shaft shown partially and in alternative pivoting conditions and with the conveyor belt shown partially.

It should be further noted that either return training idler embodiments 20/120 can be installed on conveyor belts of varying width, e.g., belt width +9 or belt width +15 frame spacing. As can be appreciated, with regard to the first embodiment 20, as the length of the shaft 24 increases (for use on wider conveyor belts), the amount of pivoting by the idler 20 decreases due to the impact of the shaft pivot tube 28 against the shaft 24 (see FIG. 7D) at a longer distance from the internal pivot point 24C. As such, the idler 20 tends to be used on small conveyor belts. In contrast, with regard to the second embodiment 120, without the stop mechanism 160, the shaft 128 could pivot in an unlimited condition. As such, the second embodiment 120 can be used on a wide variety of conveyor belt sizes, especially large conveyor belts (e.g., 120 inches wide). Because of the wide range that the shaft 128 can pivot, the stop mechanism 160 can be adjusted to provide a desirable range (β) of pivot motion of the idler 120 that achieves maximum utility (i.e., maximum training capability, i.e., the ability of the pivoting idler 120 to restore the conveyor belt back to its centered position), as referenced from a transverse conveyor belt axis when the idler 120 is centered. By way of example only, an exemplary optimum rotation angle in that pivot motion range (β) may comprise 4.5° from a transverse conveyor belt axis when the idler 120 is centered, as shown in FIG. 9.

While the invention has been described in detail and with reference to specific examples thereof, it will be apparent to one skilled in the art that various changes and modifications can be made therein without departing from the spirit and scope thereof.

What is claimed is:

1. An apparatus for providing automatic adjustment of the return side of a conveyor belt, operating in a conveyor structure, that has drifted from the conveyor belt's central position during operation, said apparatus comprising:

a pair of tapered roller elements rotatably mounted to a non-collinear pivoting member, each of said pair of tapered roller elements being tapered from one end of said roller element to an opposite end of said roller element and wherein said pair of tapered roller elements are rotatably mounted on opposite sides of a pivot point of said non-collinear pivoting member; and
said pair of tapered roller elements forming a profile that is parallel to and in contact with a horizontal portion of the return side of the conveyor belt, said tapered roller elements rotating and pivoting automatically to restore the conveyor belt to the conveyor belt's central position.

2. The apparatus of claim 1 wherein each of said tapered roller elements comprises a taper angle and wherein said non-collinear pivoting member comprises an offset angle derived from said taper angle, the combination of said taper angle and said offset angle establishing said profile that is parallel to the horizontal portion of the return side of the conveyor belt.

3. The apparatus of claim 2 wherein said offset angle is defined as twice the taper angle subtracted from 180°.

4. The apparatus of claim 1 further comprising an elevation adjustment mechanism for permitting said apparatus to be adjusted in height.

5. The apparatus of claim 2 wherein said non-collinear pivoting member comprises:
a non-collinear shaft having two opposing ends that are fixed to the conveyor structure; and
a non-collinear hollow tube in which said non-collinear shaft is disposed, said non-collinear tube being pivotally-mounted to said non-collinear shaft at said pivot point, said pair of tapered roller elements being rotatably mounted on said hollow tube.

6. The apparatus of claim 2 wherein said non-collinear pivoting member comprises a non-collinear shaft having a pivot pin that is located centrally of said shaft at said pivot point and which is received in the conveyor structure that allows said non-collinear shaft to rotate about said pivot pin, said tapered roller elements being rotatably mounted on said non-collinear shaft and on opposite sides of said pivot pin.

7. The apparatus of claim 6 further comprising a stop mechanism for limiting a pivoting angle of said non-collinear pivoting member.

8. The apparatus of claim 7 wherein said stop mechanism is adjustable.

9. The apparatus of claim 8 wherein said stop mechanism is configured for an optimum pivoting motion range that maximizes the training capability of said idler as measured from an axis representing a centered position of said non-collinear shaft.

10. The apparatus of claim 5 wherein each of said tapered roller elements rotate on bearings secured to an outer surface of said non-collinear hollow tube.

11. The apparatus of claim 5 wherein each of said tapered roller elements comprises bearings secured to an outer surface of an inner hollow roller tube positioned within each of said tapered roller elements, each of said inner hollow roller tubes being positioned over a respective portion of said non-collinear hollow tube.

12. The apparatus of claim 6 wherein each of said tapered roller elements rotate on bearings secured to an outer surface of said non-collinear shaft.

13. The apparatus of claim 6 wherein each of said tapered roller elements comprises bearings secured to an outer surface of an inner hollow roller tube positioned within each of said tapered roller elements, each of said inner hollow roller tubes being positioned over a respective portion of said non-collinear shaft.

14. The apparatus of claim 1 wherein said tapered roller elements operate to automatically restore the conveyor belt to the conveyor belt's central position when the conveyor belt has a cupped profile defined as the sides of the conveyor belt being out-of-contact with said tapered roller elements.

15. A method for providing automatic adjustment of the return side of a conveyor belt, operating in a conveyor structure, that has drifted from the conveyor belt's central position during operation, said method comprising:
providing a pair of tapered roller elements on opposite sides of an angled member that pivots in a plane parallel to the return side of the conveyor belt, and wherein each of said tapered roller elements is tapered from one end of said roller element to an opposite end of said roller element;
positioning said tapered roller elements into contact with the return side of the conveyor belt such that said pair of tapered roller elements form a profile that is parallel with a horizontal portion of the return side of the conveyor belt; and
said angled member automatically pivoting and said tapered roller elements automatically rolling against the return side of the conveyor belt for restoring the conveyor belt to the conveyor belt's central position during conveyor belt operation.

16. The method of claim 15 wherein each of said tapered roller elements is formed with a taper angle and wherein said step of providing a pair of tapered roller elements comprises forming said angled member based on an offset angle derived from said taper angle, the combination of said taper angle and said offset angle establishing said profile that is parallel to the horizontal portion of the return side of the conveyor belt.

17. The method of claim 16 wherein said offset angle is defined as twice the taper angle subtracted from 180°.

18. The method of claim 15 further comprising the step of adjusting the height of said apparatus by manipulating an elevation adjustment mechanism.

19. The method of claim 16 wherein said step of providing a pair of tapered roller elements on an angled member that pivots comprises:
providing a shaft having two portions formed at said offset angle;
providing a hollow tube having two portions formed at said offset angle;
positioning said shaft within said hollow tube to form said angled member;
pivotally mounting said hollow tube to said shaft such that said hollow tube can pivot with respect to said shaft when opposite ends of said shaft are fixed to the conveyor structure; and
rotatably mounting said tapered roller elements to respective ones of said two portions of said hollow tube.

20. The method of claim 16 wherein said step of providing a pair of tapered roller elements on an angled member that pivots comprises:
providing a shaft having two portions formed at said offset angle to form said angled member;
pivotally mounting said shaft with a pivot pin, where said offset angle is formed, to the conveyor structure such that said shaft can pivot about said pin; and
rotatably mounting said tapered roller elements to respective ones of said two portions.

21. The method of claim 20 further including a step of introducing a stop mechanism for limiting a pivoting angle of said shaft.

22. The method of claim 21 wherein said stop mechanism is adjustable.

23. The method of claim 22 wherein said step of introducing said stop mechanism comprises configuring said stop mechanism that permits a pivoting motion range of said shaft that maximizes the training capability of said idler as measured from an axis representing a centered position of said shaft.

24. The method of claim 19 wherein said step of providing a hollow tube comprises securing bearings to an outer surface of said hollow tube to allow said tapered roller elements to rotate about said hollow tube.

25. The method of claim 19 wherein step of rotatably mounting said tapered roller elements to respective ones of said two portions of said hollow tube comprises securing bearings to an outer surface of an inner hollow roller tube positioned within each of said tapered roller elements, each of said inner hollow roller tubes being positioned over a respective portion of said hollow tube.

26. The method of claim 20 wherein said step of providing a shaft comprises securing bearings to an outer surface of said shaft to allow said tapered roller elements to rotate about said shaft.

27. The method of claim 20 wherein step of rotatably mounting said tapered roller elements to respective ones of said two portions comprises securing bearings to an outer surface of an inner hollow roller tube positioned within each of said tapered roller elements, each of said inner hollow roller tubes being positioned over a respective portion of said shaft.

28. The method of claim 15 wherein said step of said angled member automatically pivoting and said tapered roller elements automatically rolling against said return side comprises automatically restoring the conveyor belt to the conveyor belt's central position when the conveyor belt has a cupped profile defined as the sides of the conveyor belt being out-of-contact with said tapered roller elements.

* * * * *